(12) United States Patent
Loow et al.

(10) Patent No.: US 12,441,153 B2
(45) Date of Patent: Oct. 14, 2025

(54) VEHICLE DAMPER EXTENSION

(71) Applicant: Öhlins USA Inc., Hendersonville, NC (US)

(72) Inventors: Christer Loow, Hendersonville, NC (US); Melvin Alberto Chacon, Hendersonville, NC (US); Michael Hodges, Huntersville, NC (US)

(73) Assignee: ÖHLINS RACING USA INC., Hendersonville, NC (US)

( * ) Notice: Subject to any disclaimer, the term of this patent is extended or adjusted under 35 U.S.C. 154(b) by 0 days.

(21) Appl. No.: 18/639,735

(22) Filed: Apr. 18, 2024

(65) Prior Publication Data

US 2024/0262154 A1    Aug. 8, 2024

Related U.S. Application Data

(63) Continuation-in-part of application No. 18/154,443, filed on Jan. 13, 2023.

(51) Int. Cl.
*B60G 15/06* (2006.01)
*B60G 17/08* (2006.01)

(52) U.S. Cl.
CPC ........... *B60G 17/08* (2013.01); *B60G 15/062* (2013.01); *B60G 2202/24* (2013.01); *B60G 2500/30* (2013.01)

(58) Field of Classification Search
CPC ............ B60G 17/0272; B60G 2202/24; B60G 15/062; B60G 17/08
See application file for complete search history.

(56) References Cited

U.S. PATENT DOCUMENTS

| 4,154,461 | A | * | 5/1979 | Schnittger | .......... B60G 17/0272 280/124.179 |
|---|---|---|---|---|---|
| 4,821,983 | A | | 4/1989 | Aubry et al. | |
| 5,009,451 | A | * | 4/1991 | Hayashi | .......... B60G 17/0272 267/221 |
| 5,348,112 | A | * | 9/1994 | Vaillancourt | .......... F16F 9/44 280/5.514 |
| 5,950,996 | A | | 9/1999 | Pradel | |
| 7,364,142 | B2 | * | 4/2008 | Beck | ........... F16F 9/063 188/315 |
| 7,766,136 | B2 | * | 8/2010 | Runkel | ........... F16F 9/0209 188/297 |
| 8,262,100 | B2 | | 9/2012 | Thomas | |
| 8,469,164 | B2 | * | 6/2013 | Kondo | .......... B60G 13/001 267/221 |

(Continued)

FOREIGN PATENT DOCUMENTS

| CN | 204322979 U | 5/2015 |
|---|---|---|
| CN | 113883206 A | 1/2022 |

(Continued)

*Primary Examiner* — Paul N Dickson
*Assistant Examiner* — Maxwell L Meshaka
(74) *Attorney, Agent, or Firm* — Kagan Binder, PLLC

(57) ABSTRACT

A vehicle of the present disclosure includes a vehicle body and a damper assembly for controlling movement of a wheel relative to the vehicle body. The vehicle includes a fluid connector spaced from the damper assembly and supported at the vehicle body, the fluid connector in fluid communication with the damper assembly to provide fluid to the damper assembly and increase ride height of the vehicle.

17 Claims, 10 Drawing Sheets

(56) References Cited

U.S. PATENT DOCUMENTS

| | | | |
|---|---|---|---|
| 8,616,563 B2* | 12/2013 | Lee | B60G 17/0155 |
| | | | 267/195 |
| 9,068,616 B1 | 6/2015 | Serbu | |
| 9,180,746 B2 | 11/2015 | Kasuga et al. | |
| 9,669,674 B2 | 6/2017 | Luczak et al. | |
| 11,351,835 B2* | 6/2022 | Son | B60G 15/062 |
| 11,511,591 B2* | 11/2022 | Park | B60G 13/003 |
| 12,179,542 B2* | 12/2024 | Müller | B60G 17/018 |
| 2006/0213733 A1 | 9/2006 | Masaki | |
| 2009/0065314 A1* | 3/2009 | Kondo | F16F 15/03 |
| | | | 188/290 |
| 2013/0221626 A1* | 8/2013 | Lee | B60G 17/08 |
| | | | 280/5.514 |
| 2016/0263958 A1 | 9/2016 | Murakami | |
| 2021/0061044 A1 | 3/2021 | Park | |
| 2021/0061045 A1* | 3/2021 | Son | B60G 15/062 |
| 2022/0203801 A1* | 6/2022 | Navarrete | B60G 17/08 |
| 2022/0379677 A1* | 12/2022 | Lusso | F16F 9/065 |
| 2023/0150333 A1* | 5/2023 | Hirani | B60G 17/06 |
| | | | 701/37 |
| 2024/0262154 A1* | 8/2024 | Loow | B60G 15/062 |
| 2024/0336105 A1* | 10/2024 | Müller | B60G 17/018 |

FOREIGN PATENT DOCUMENTS

| | | | | |
|---|---|---|---|---|
| CN | 114435053 A | * | 5/2022 | |
| CN | 114599898 A | | 6/2022 | |
| DE | 102023202025 A1 | * | 2/2024 | |
| WO | WO-2008087660 A1 | * | 7/2008 | B60G 15/062 |
| WO | WO-2020077728 A1 | * | 4/2020 | |

* cited by examiner

VEHICLE DAMPER EXTENSION

CROSS-REFERENCE TO RELATED APPLICATIONS

This application is a continuation-in-part of and claims priority to U.S. patent application Ser. No. 18/154,443 filed on Jan. 13, 2023, hereby incorporated herein by reference in its entirety.

FIELD

The present disclosure generally relates to vehicle dampers. More particularly, the present disclosure relates to a vehicle damper with a variable length to adjust a ride height of a vehicle.

BACKGROUND

Dampers for vehicles are commonly included in a wide variety of vehicle segments. Some vehicles include semi-active damping that adjusts damping levels according to road conditions and vehicle dynamics. The dampers are between a body and the suspension system of the vehicle. A piston is located within the damper. The piston is connected to the vehicle body or the suspension of the vehicle through a piston rod. As the damper is compressed or extended, fluid flows between rebound and compression working chambers within the damper to counteract vibrations. By adjusting the flow of damping fluid between the chambers, greater or lower damping forces may be generated.

DETAILED DESCRIPTION

A vehicle of the present disclosure includes a vehicle body and a damper assembly for controlling movement of a wheel relative to the vehicle body. The vehicle includes a fluid connector spaced from the damper assembly and supported at the vehicle body, the fluid connector in fluid communication with the damper assembly to provide fluid to the damper assembly and increase ride height of the vehicle.

The damper assembly of the present disclosure includes a first cylinder defining a first chamber and a second cylinder defining a second chamber. The damper assembly includes a piston rod extending from within the first chamber along an axis to the second cylinder. The piston rod is movable relative to the second cylinder and may be sealed to the second cylinder. The damper assembly includes a piston fixed to the piston rod and movable within the first chamber along the axis. The damper assembly includes a plunger movable within the second chamber along the axis from a compact position to an extended position, e.g., in response to fluid being provided to the damper assembly though the fluid connector. The damper assembly may include a coil spring surrounding the first cylinder and the second cylinder. Movement of the plunger toward the compact position or the extended position decreases or increases the length of the damper assembly, respectively, e.g., to control a ride height of a vehicle having the damper assembly. The piston rod sealed to the second cylinder and/or the coil spring surrounding the first cylinder and the second cylinder may provide improved packaging and assembly characteristics, e.g., relative to conventional vehicle ride height control systems.

Figure 1:
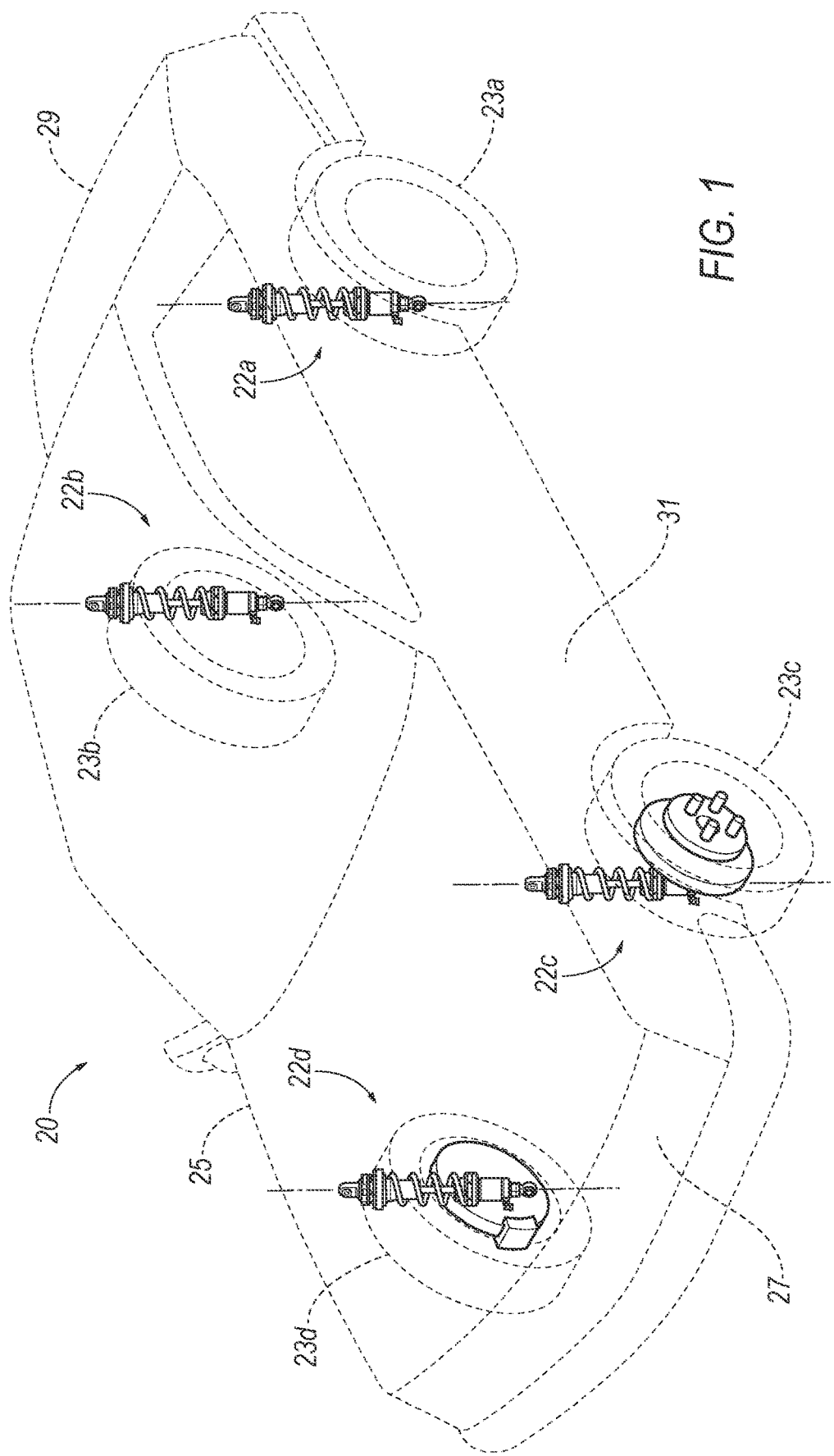
FIG. 1 is a schematic illustration of a vehicle including a suspension system having a plurality of damper assemblies.
Figure 5:
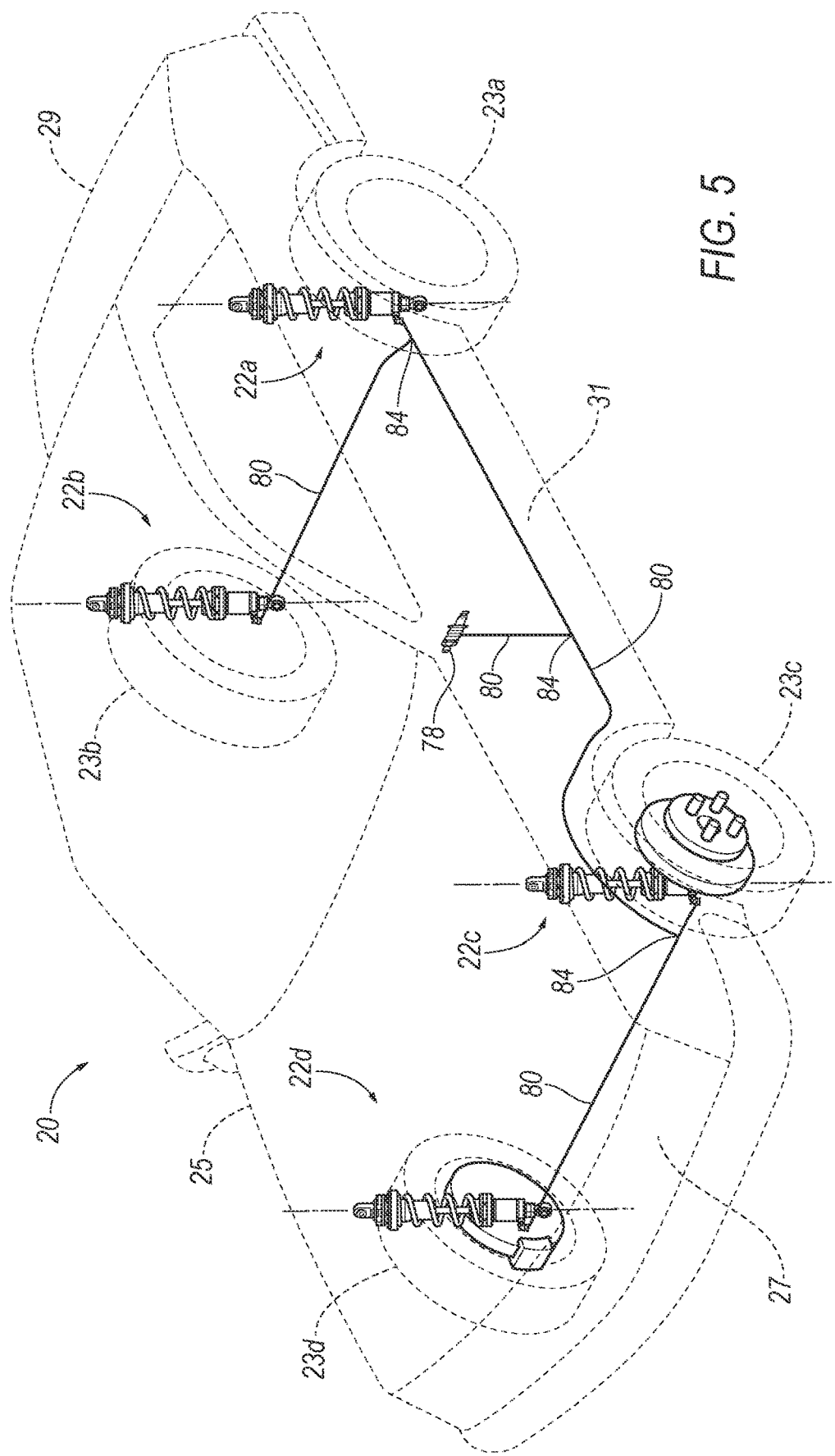
FIG. 5 is a schematic illustration of a vehicle including a suspension system having a plurality of damper assemblies and a fluid connector.
Figure 6:
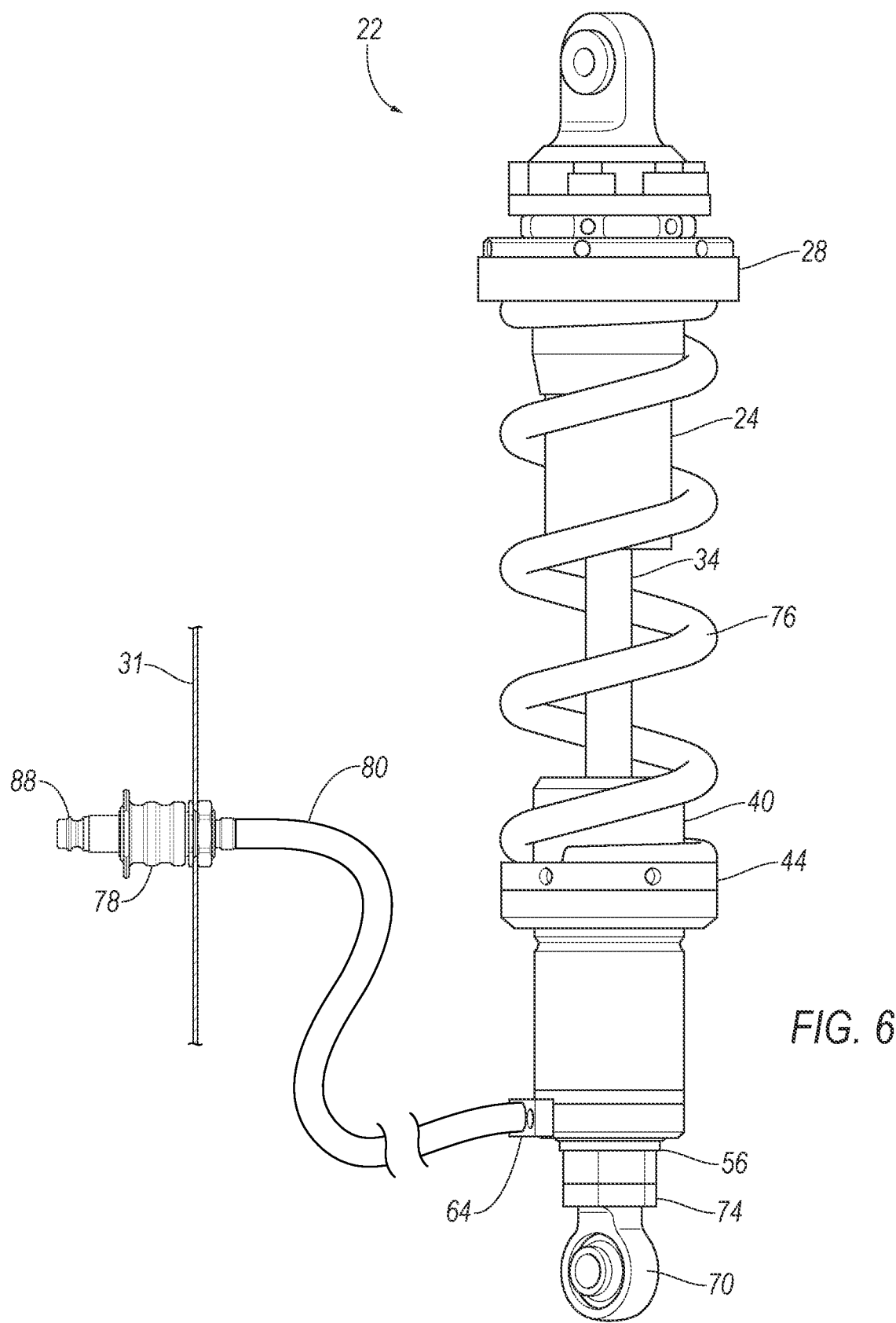
FIG. 6 is a perspective view a damper assembly and the fluid connector.
Figure 7:
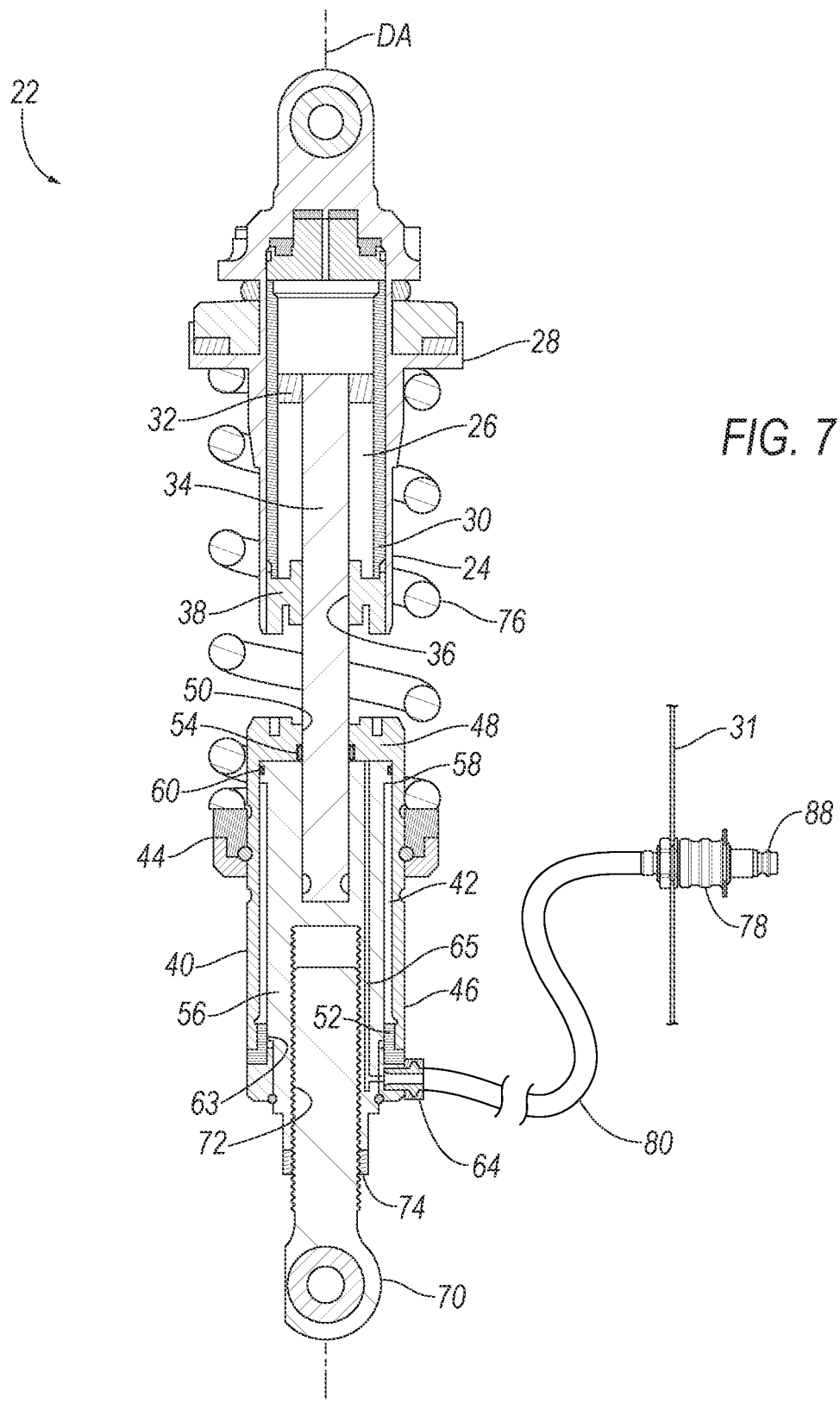
FIG. 7 is a cross-sectional view of the damper assembly in a compact position and the fluid connector.
Figure 8:
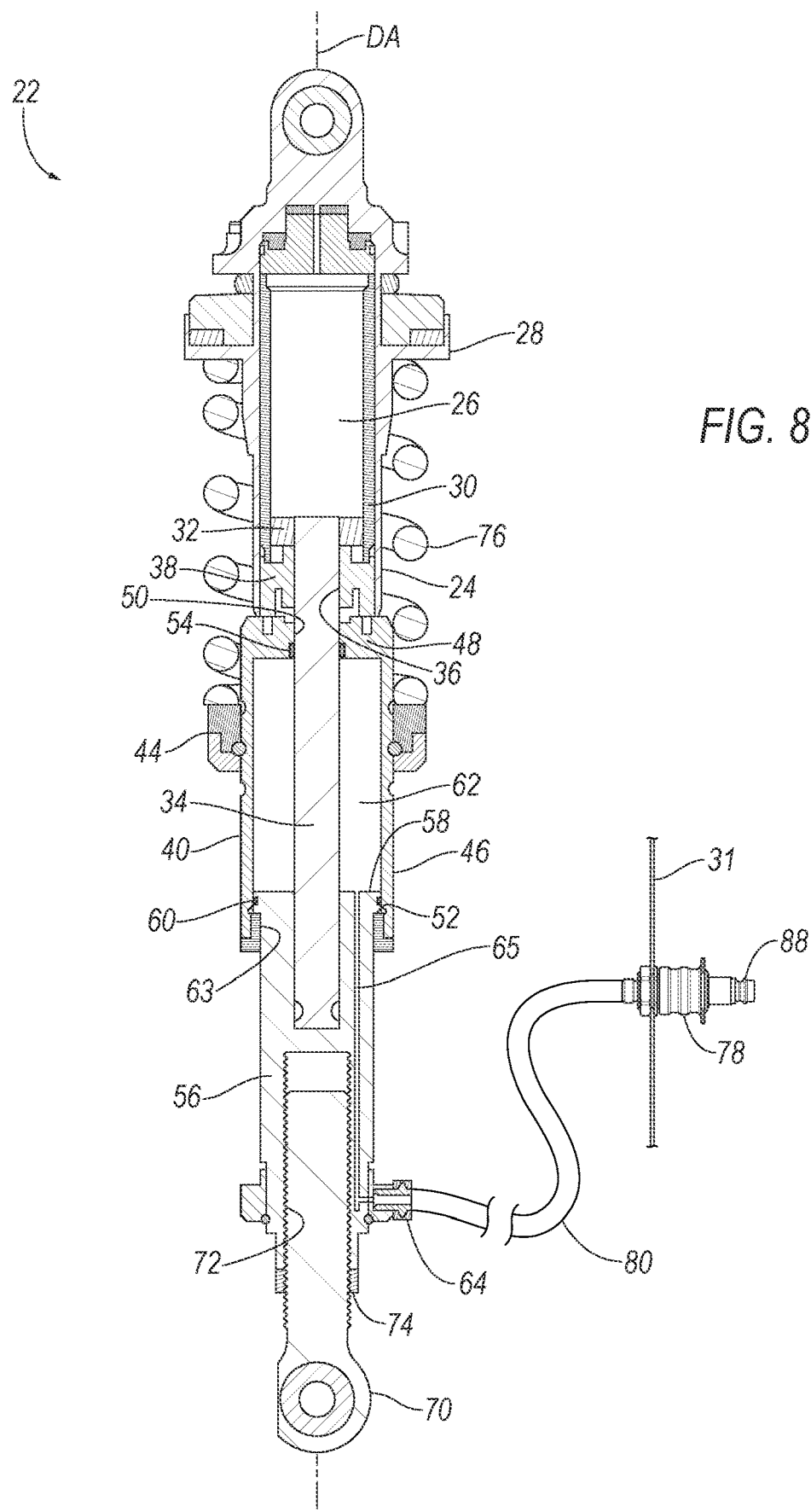
FIG. 8 is a cross-sectional view of the damper assembly in an extended position and the fluid connector.

With reference to FIGS. 1 and 5, and wherein like numerals indicate like parts throughout the several views, a vehicle 20 having a plurality of exemplary damper assemblies 22a, 22b, 22c, 22d is shown. Each damper assembly 22a, 22b, 22c, 22d may continuously adjust damping levels according to road conditions and vehicle dynamics to dampen shocks and vibrations from variations in the road surface felt by occupants of the vehicle 20. The performance of the damper assembly 22a, 22b, 22c, 22d may be electronically controlled, e.g., with damping levels controlled by an electronic control unit (not shown). The damper assembly 22a, 22b, 22c, 22d may be elongated along an axis DA.

The vehicle 20 may be any suitable type of ground vehicle, e.g., a passenger or commercial automobile such as a sedan, a coupe, a truck, a sport utility, a crossover, a van, a minivan, a taxi, a bus, etc. During normal operation of the vehicle 20, damper assemblies 22a, 22b, 22c, 22d at the front and/or rear of the vehicle 20 may extend and retract.

In the present description, relative vehicular orientations and directions (by way of example, front, rear, top, bottom, outboard, inboard, inward, outward, forward, rearward, lateral, left, right, etc.) are from the perspective of an occupant seated in the vehicle 20 and facing forward, e.g., toward a forward windshield of the vehicle 20. The forward direction of the vehicle 20 is the direction of movement of the vehicle 20 when the vehicle 20 is engaged in forward drive with wheels 23a, 23b, 23c, 23d of the vehicle 20 straight.

The vehicle 20 includes a vehicle body 25 that defines a passenger cabin to house occupants, if any, of the vehicle 20. The vehicle body 25 has a front end 27 and a rear end 29, the front end 27 being forward of the rear end 29. One or more seats may be supported in the passenger cabin, e.g., by the floor of the vehicle body 25. The vehicle 20 may include a vehicle frame (not shown) that supports the vehicle body 25. For example, the vehicle body 25 and the vehicle frame may be of unitary construction (also referred to as unibody construction), in which the vehicle frame is unitary with the vehicle body 25, e.g., including frame rails, rockers, pillars, roof rails, etc. As another example, the vehicle body 25 and frame may be a body-on-frame construction (also referred to as a cab-on-frame construction) in which the vehicle body 25 (including rockers, pillars, roof rails, etc.) and the vehicle frame are separate components, i.e., are modular, and the vehicle body 25 is supported on and affixed to the vehicle frame, e.g., to the frame rails. Alternatively, the vehicle frame and the vehicle body 25 may have any suitable construction. The vehicle frame and the vehicle body 25 may be of any suitable material, for example, steel, aluminum, and/or fiber-reinforced plastic, etc.

The vehicle body 25 includes body panels 31 partially defining an exterior of the vehicle 20. The body panels 31 may present a class-A surface, e.g., a finished surface exposed to view by a customer and free of unaesthetic blemishes and defects.

The damper assemblies 22a, 22b, 22c, 22d control movement of the wheels 23a, 23b, 23c, 23d of the vehicle 20 relative to the vehicle body 25. For example, a first damper assembly 22a may control movement of a first wheel relative 23a to the vehicle body 25. A second damper 22b assembly may control movement of a second wheel 23b relative to the vehicle body 25. A third damper 22c assembly may control movement of a third wheel 23c relative to the vehicle body 25. A fourth damper 22d assembly may control movement of a fourth wheel 23d relative to the vehicle body 25. The first damper assembly 22a, the first wheel 23a, the second damper assembly 22b, and the second wheel 23b may be at the rear end 29 of the vehicle body 25. The third damper assembly 22c, the third wheel 23c, the fourth damper assembly 22d, and the fourth wheel 23d may be at the front end 27 of the vehicle body 25.

With reference to FIGS. 2-4 and 6-8, the damper assembly 22a, 22b, 22c, 22d includes a first cylinder 24 that defines a first chamber 26. The first chamber 26 may be surrounded by the first cylinder 24 and between opposing distal ends of the first cylinder 24. The first cylinder 24 may include a first flange 28. The first flange 28 may be extended radially outward relative to the axis DA and away from the first chamber 26. The first flange 28 may surround the first chamber 26.

The damper assembly 22a, 22b, 22c, 22d may include one of more internal tubes 30 disposed in the first cylinder 24. The internal tubes 30 may be concentric. The internal tubes 30 may define, e.g., a central working chamber and a reservoir chamber surrounding the working chamber. The first cylinder 24, including the working chamber and the reservoir chamber contain a working fluid, e.g., a liquid such as hydraulic oil. The flow of working fluid in the first cylinder 24, e.g., between the working chamber and the reservoir chamber contain may be controlled with active electronic valves and/or passive mechanical valves.

The damper assembly 22a, 22b, 22c, 22d includes a piston assembly having a piston 32 and a piston rod 34. The piston 32 is fixed to the piston rod 34 and movable within the first chamber 26 along the axis DA. For example, the piston 32 may be slidable along the axis DA within the working chamber. The damper assembly 22a, 22b, 22c, 22d may include one or more passages, valves, etc., that control fluid flow from one side of the piston 32 to the other. The piston rod 34 extends from within first chamber 26 along the axis DA. The piston rod 34 may extend along the axis DA from the piston 32 to external of the first chamber 26, e.g., via a first opening 36 of a first end cap 38 of the first cylinder 24. The piston rod 34 is movable relative to the first cylinder 24. For example, the piston rod 34 may be slidable within the first opening 36 and move along the axis DA concurrent with the piston 32.

The damper assembly 22a, 22b, 22c, 22d include a second cylinder 40 that defines a second chamber 42. The second chamber 42 may be surrounded by the second cylinder 40 and between opposing distal ends of the second cylinder 40. The second cylinder 40 includes a second flange 44. The second flange 44 extend radially outward relative to the axis DA and away from a main body 46 of the second cylinder 40. The main body 46 may surround the second chamber 42, e.g., the main body 46 may be tubular. The second flange 44 may surround the main body 46. The second cylinder 40 may include a second end cap 48 that encloses the second camber at a distal end of the main body 46. The second end cap 48 may include a second opening 50. The second end cap 48 may be fixed to the main body 46, e.g., via weld, treaded engagement, etc. The second end cap 48 and the main body 46 may be unitary. Unitary means a single, uniform piece of material with no seams, joints, fasteners, or adhesives holding it together, i.e., formed together simultaneously as a single continuous unit, e.g., by machining from a monolithic blank, molding, forging, casting, etc. Non-unitary components, in contrast, are formed separately and subsequently assembled, e.g., by threaded engagement, welding, etc. The second cylinder 40 may include a third flange 52. The third flange 52 may extend from the main body 46 radially inward relative to the axis DA. The third flange 52 may be opposite the second end cap 48, e.g., at an opposing distal end of the main body 46. The third flange 52 may be fixed to the main body 46. The third flange 52 and the main body 46 may be unitary.

The piston rod 34 extends along the axis DA away from the first cylinder 24 to the second cylinder 40, e.g., to within the second chamber 42. For example, the piston rod 34 may extend along the axis DA from external of the second chamber 42 to internal of the second chamber 42 via the second opening 50 of the second end cap 48. The piston rod 34 is movable relative to the second cylinder 40. For example, the piston 32 may be slidable within the second opening 50 along the axis DA.

The piston rod 34 is sealed to the second cylinder 40 to restrict fluid flow out of the second chamber 42. The piston rod 34 may be sealed to the second cylinder 40 at the second opening 50 of the second end cap 48. For example, an O-ring 54 may seal the piston rod 34 to the second cylinder 40. The O-ring 54 may surround the piston rod 34. The O-ring 54 may be disposed between the piston rod 34 and the second end cap 48 radially relative to the axis DA.

The damper assembly 22a, 22b, 22c, 22d includes a plunger 56 that is movable within the second chamber 42 along the axis DA. Movement of the plunger 56 varies a length of the damper assembly 22a, 22b, 22c, 22d, e.g., to control a ride height of the vehicle 20. The plunger 56 may include a fourth flange 58. The fourth flange 58 may extend radially outward, e.g., toward the main body 46 of the second cylinder 40. The plunger 56 may be sealed to the second cylinder 40. For example, an O-ring 60 may seal an outer perimeter of the fourth flange 58 to an inside surface of the main body 46 of the second cylinder 40. The plunger 56 and the second cylinder 40 may define a volume 62 within the second chamber 42, e.g., between the plunger 56 and the second end cap 48. The plunger 56 may extend out of the second chamber 42, e.g., via an opening 63 surrounded by the third flange 52. The piston rod 34 may be fixed to the plunger 56, e.g., at the end of the plunger 56 having the fourth flange 58, to inhibit relative movement there between. The plunger 56 and the piston 32 may concurrently move relative to the second cylinder 40. The plunger 56 may extend away from the second cylinder 40 opposite the piston rod 34. For example, the piston rod 34 may extend away from the second cylinder 40 along the axis DA in a first direction and the plunger 56 may extend away from the second cylinder 40 along the axis DA in a second direction opposite the first direction.

Figure 3:
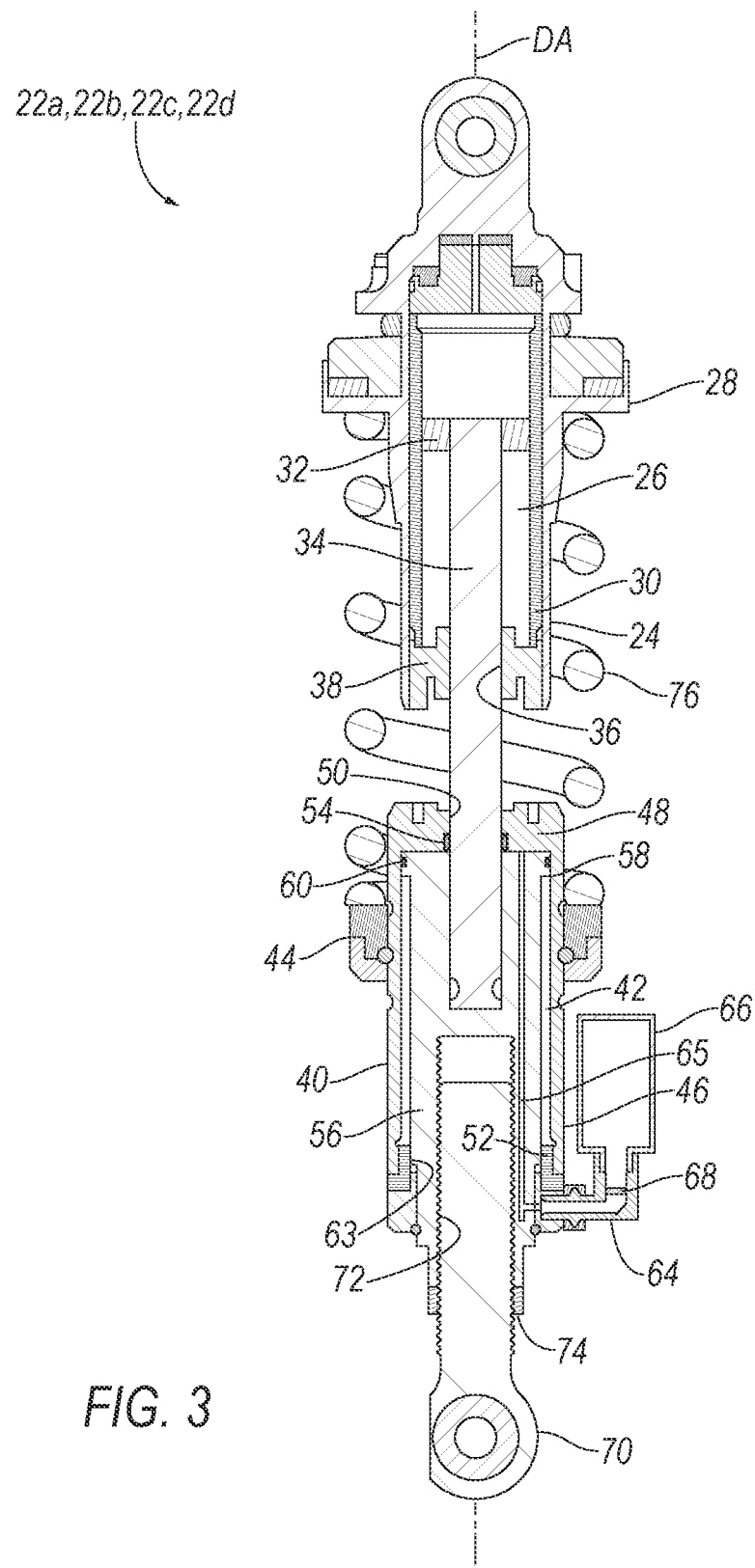
FIG. 3 is a cross-sectional view of the damper assembly in a compact position.
Figure 4:
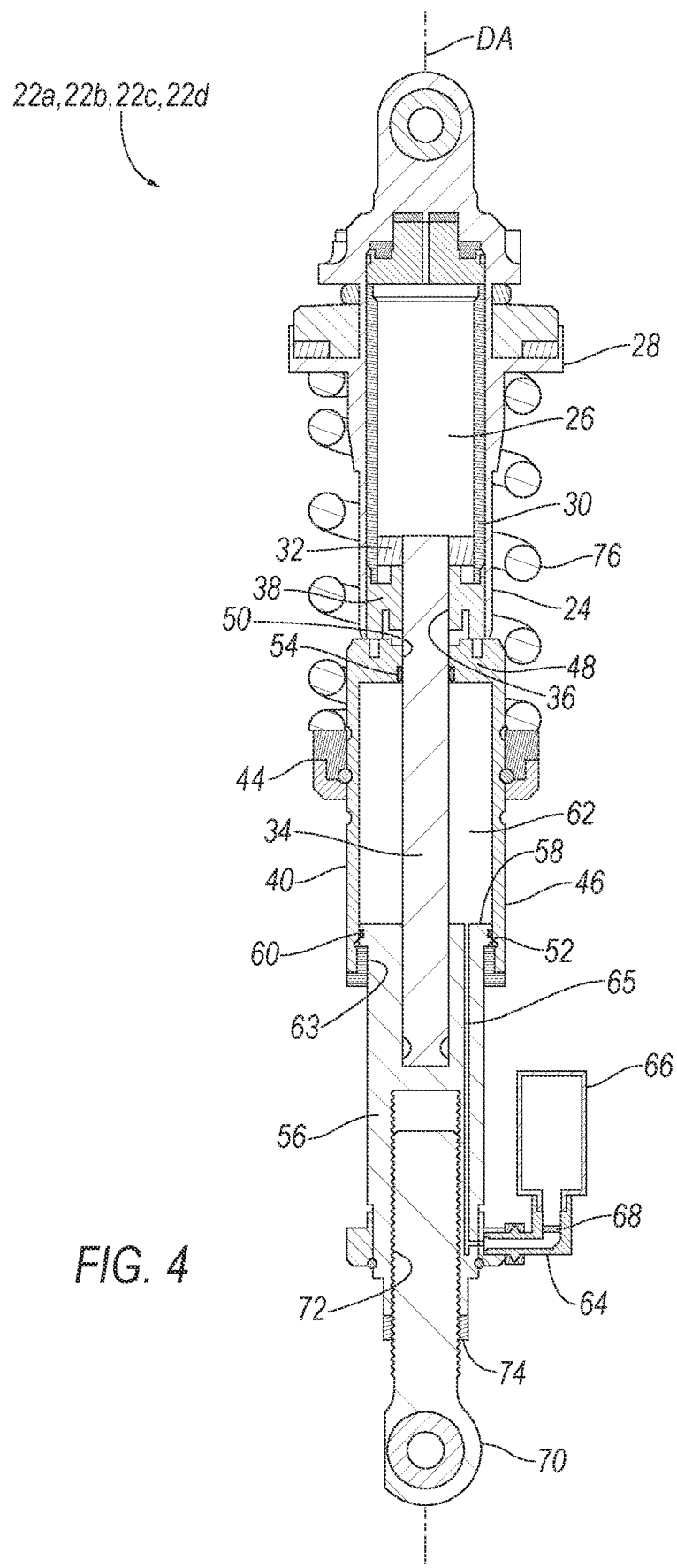
FIG. 4 is a cross-sectional view of the damper assembly in an extended position.

The plunger 56 is movable from a compact position, shown in FIG. 3, to an extended position, shown in FIG. 4, and vice versa. The damper assembly 22a, 22b, 22c, 22d is longer, e.g., provides greater ride height, at the extended position than at the compact position. The piston 32 may be further from the first end cap 38 at the compact position than at the extended position. The volume 62 defined by the plunger 56 and the second end cap 48 may be greater at the extended position than at the compact position. With reference to FIG. 3, the first cylinder 24 is spaced from the second cylinder 40 along the axis DA when the plunger 56 is at the compact position. For example, the first end cap 38 of first cylinder 24 may be spaced from the second end cap 48 of the second cylinder 40 at the compact position. The third flange 52 may be spaced from the fourth flange 58 along the axis DA at the compact position. With reference to FIG. 4, the first cylinder 24 may abut the second cylinder 40 when the plunger 56 is at the extended position. For example, the first end cap 38 of first cylinder 24 may abut the second end cap 48 of the second cylinder 40 at the extended position. The third flange 52 may abut the fourth flange 58 at the extended position.

The plunger 56 includes a port 64 in fluid communication with the second chamber 42 to permit fluid flow into and/or out of the second chamber 42, e.g., into or out of the volume 62 defined between the plunger 56 and the second end cap 48. For example, an internal passage 65 may be defined by the plunger 56 between the port 64 and an end of the plunger 56 having the fourth flange 58. The internal passage 65 may be open to the volume 62 between the plunger 56 and the second end cap 48. Fluid flow into the port 64 may cause an increase in size of the volume 62 and move the plunger 56 toward the extended position. Fluid flow out of the port 64 may permit a decrease in size of the volume 62 and move the plunger 56 toward the compact position.

The damper assembly 22a, 22b, 22c, 22d may include an eyelet 70 fixed to the plunger 56. The eyelet 70 enables the damper assembly 22a, 22b, 22c, 22d to be connected to the vehicle body 25, suspension, or another component. The eyelet 70 may be threadedly engaged with the plunger 56, e.g., such that rotation of the eyelet 70 relative to the plunger 56 in one direction increases the length of the damper assembly 22a, 22b, 22c, 22d and rotation of the eyelet 70 in an opposite direction decreases the length. In other words, the eyelet 70 and the plunger 56 may have threads 72 engaged with each other. A lock nut 74 may be engaged with threads of the eyelet 70 and tightened in abutment with the plunger 56 to maintain the position of the eyelet 70 relative to the plunger 56.

A coil spring 76 surrounds the piston rod 34, the first cylinder 24 and the second cylinder 40 and urges the first cylinder 24 and the second cylinder 40 away from each other along the axis DA. For example, the coil spring 76 may extend from the first flange 28 to the second flange 44. The coil spring 76 may abut both the first flange 28 and the second flange 44. The coil spring 76 may be compressed between the first flange 28 and the second flange 44. The coil spring 76 may be more compressed when the plunger 56 is at the extended position than at the compact position. In other words, the coil spring 76 urges the first flange 28 away from the second flange 44, e.g., extending the damper assembly 22a, 22b, 22c, 22d.

Figure 2:
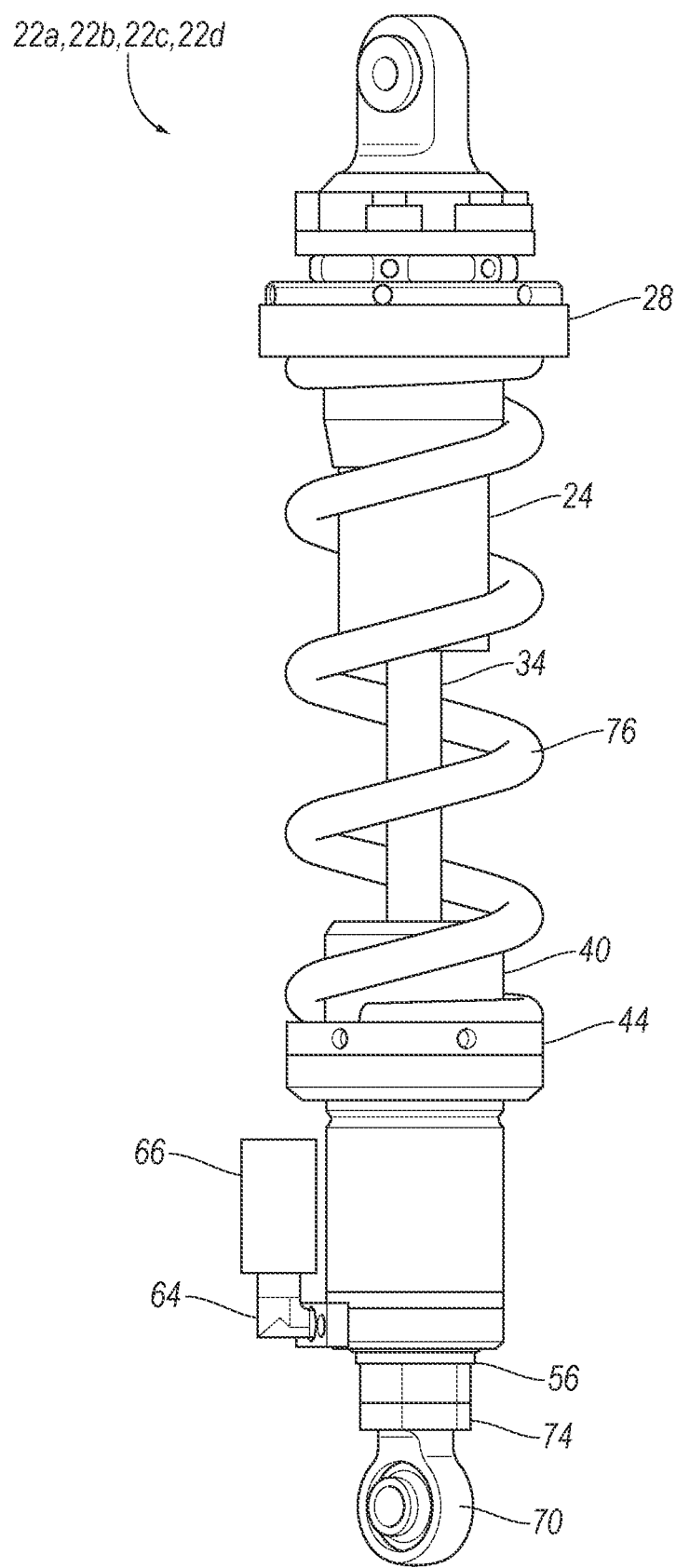
FIG. 2 is a perspective view a damper assembly.

With reference to FIGS. 2-4, a canister 66 for storing, e.g., compressed fluid may be fluidly connected to the port 64 to provide air to the second chamber 42, e.g., to the volume 62.

Figure 10:
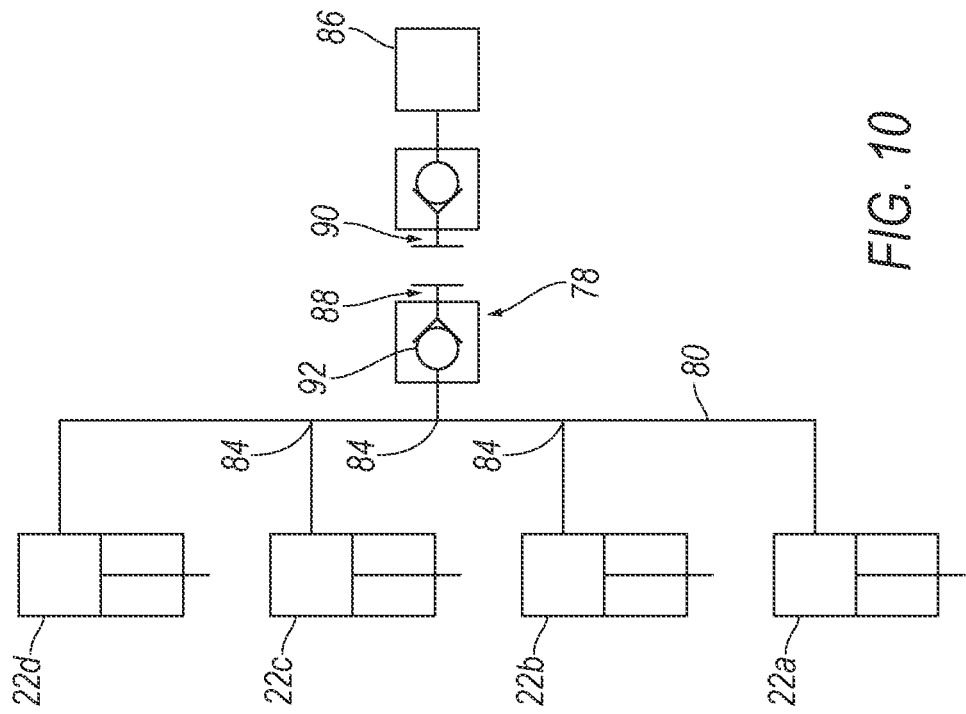
FIG. 10 is a schematic illustration of the plurality of damper assemblies and the fluid connector disconnected from the fluid supply.
Figure 9:
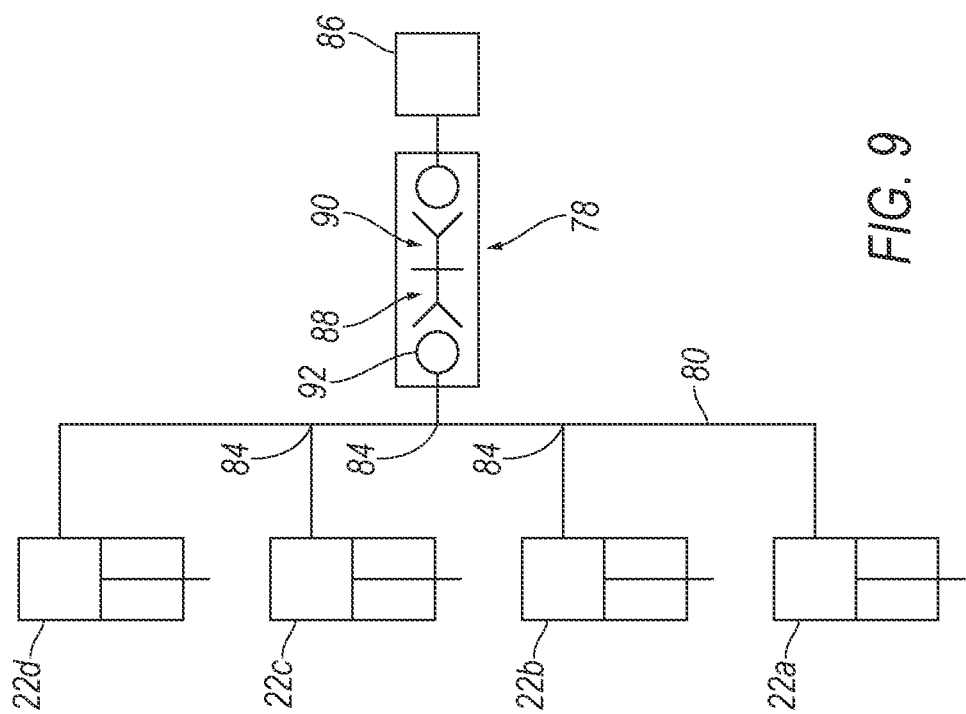
FIG. 9 is a schematic illustration of the plurality of damper assemblies and the fluid connector connected to a fluid supply.

The canister 66 may store air pressurized at sufficient pressure to move the plunger 56 to the extended position. For example, the canister 66 may store air at sufficient pressure to raise the ride height of the vehicle 20 when the pressurized air is permitted to flow into the port 64. The canister may store ambient air, nitrogen, other compressed gas or a pressurized fluid such as hydraulic fluid for providing to the volume 62. The damper assembly 22a, 22b, 22c, 22d may include a valve 68 connecting the canister 66 to the port 64. The valve 68 may by movable to a closed position where air is inhibited from flowing out of the port 64 or the canister 66, e.g., to maintain the plunger 56 at a current position. The valve 68 may be movable to a fill position where air is permitted to flow from the canister 66 to the port 64, e.g., to move the plunger 56 toward the extended position. The valve 68 may be movable to a bleed position is which air is permitted to flow out of the port 64, e.g., to move the plunger 56 toward the compact position. The valve 68 may move to the various positions in response to a command from a computer of the vehicle 20, e.g., an electronic control unit that controls the suspension system. The valve 68 may be manually operated, e.g., via mechanical linkage (not shown) accessible to an operator of the vehicle 20. The valve 68 may be, for example, a solenoid valve, a ball valve, or any suitable type, including those conventionally known. The canister 66 may be fiberglass or any suitable material sufficient to hold the pressurized air. A pressurized accumulator for hydraulic fluid, an on-board air compressor, hydraulic pump or the like (not shown) may be connected to the canister 66. With reference to FIGS. 5-10, the vehicle 20 may include a fluid connector 78. The fluid connector 78 enables connection of a fluid supply 86 with the vehicle 20. The fluid connector 78 may be, for example, a quick connect fitting, a pneumatic coupling, or other suitable structure for connecting the fluid supply 86 and facilitating fluid transfer. The fluid connector 78 may include a first end operatively coupled to one or more of the damper assemblies 22a, 22b, 22c, 22d, e.g., via tubing 80, and a second end configured to connect to the fluid supply 86. The fluid supply 86 connected to the fluid connector 78 is shown in FIG. 9. The fluid supply 86 disconnected from to the fluid connector 78 is shown in FIG. 10. For example, the second end may include a male nipple 88 and the fluid supply 86 may include a female socket 90 that receives the male nipple 88. The female socket 90 may include, e.g., springs, balls, and/or other suitable structure to lock the mating male nipple 88 of the fluid connector 78 into place.

The fluid supply 86 provides pressurized fluid. For example, the fluid supply 86 may include a pump, a pressure vessel storing pressurized fluid, or other suitable structure. The fluid may be, for example, compressed air, nitrogen, etc.

The fluid connector 78 is spaced from the damper assembly 22a, 22b, 22c, 22d and supported at the vehicle body 25. The fluid connector 78 may be fixed to the vehicle body 25 and/or the vehicle frame. The fluid connector 78 may be at one of the body panels 31 of the vehicle body 25, e.g., the fluid connector 78 may extend through the body panel 31. The male nipple 88 may extend outboard away from the vehicle body 25. The fluid connector 78 may be positioned forward of a driver side window such that the driver of the vehicle 20 can see when the fluid supply 86 is connected to the fluid connector 78.

The fluid connector 78 is in fluid communication with the first damper assembly 22a, the second damper assembly 22b, the third damper assembly 22c, and/or the fourth damper assembly 22d to provide fluid to one or more of the damper assemblies 22a, 22b, 22c, 22d and increase ride height of the vehicle 20. For example, the tubing 80 may operatively couple the fluid connector 78 with the port 64 of one or more of the damper assemblies 22a, 22b, 22c, 22d to direct fluid from the fluid connector 78 to the volume 62 within the second chamber 42 of one or more of the damper assemblies 22a, 22b, 22c, 22d, and vice versa. The tubing 80 may include one or more junctions 84.

The fluid connector 78 may include a valve 92 selectively permitting fluid flow through the fluid connector 78. For example, the valve 92 may be moveable between an open position permitting airflow through the fluid connector 78 and a closed position inhibiting airflow through the fluid connector 78. Connecting the fluid connector 78 to the fluid supply 86 (or other coupling structure) may open the valve 92. Disconnecting the fluid connector 78 from the fluid supply 86 (or other coupling structure) may close the valve 92. As another example, the valve 92 may be a one-way valve permitting fluid flow to one or more of the damper assemblies 22a, 22b, 22c, 22d and inhibiting fluid flow away from one or more of the damper assemblies 22a, 22b, 22c, 22d. The valve 92 may include an actuatable release that, upon actuation, opens the valve 92 to permit fluid flow out of the fluid connector 78 away from the one or more damper assemblies 22a, 22b, 22c, 22d.

Figure 11:
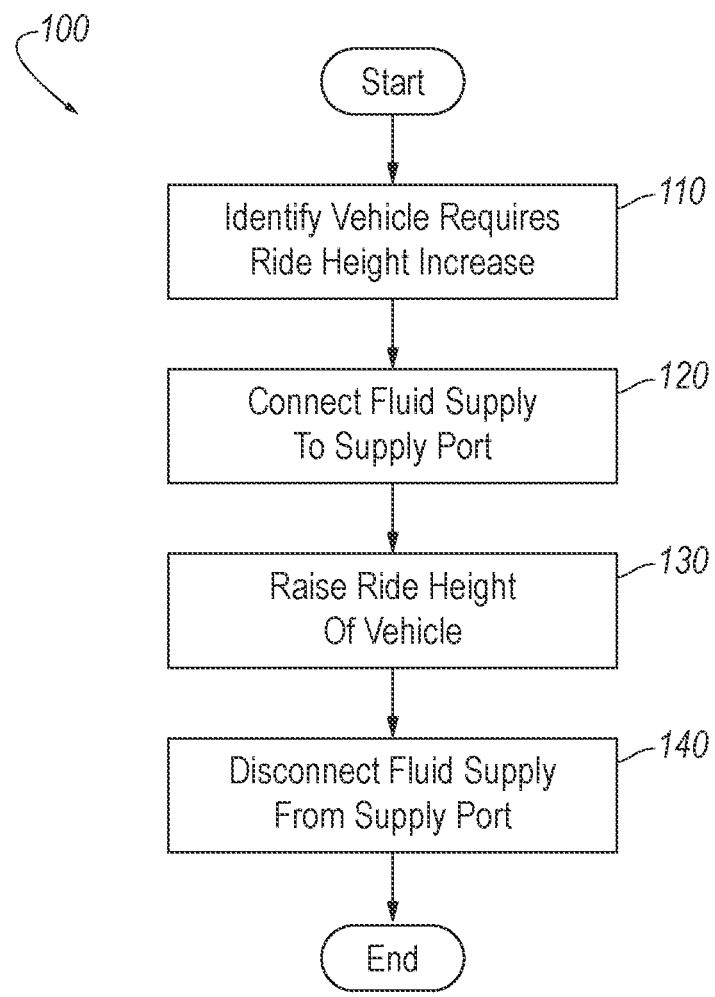
FIG. 11 is a flow chart illustrating a method of connecting the fluid supply to the fluid connector to increase ride height of the vehicle.

With reference to FIG. 11, a flow chart illustrating a method 100 for increasing a ride height of the vehicle 20 is shown. The method begins at a block 110 that includes identifying that the vehicle 20 requires an increase in ride height. Identifying that the vehicle 20 requires the increase in ride height may be performed by visually inspecting the vehicle 20. The visual inspection may indicate, for example, that the vehicle body 25 is too close to, or even abutting, ground supporting the vehicle 20. As another example, the visual inspection may indicate that one or more of the wheels 23a, 23b, 23c, 23d has an insufficient amount of air pressure. In other words, the visual inspection may indicate that one or more of the wheels 23a, 23b, 23c, 23d is fully or partially flat. Identifying that the vehicle 20 requires the increase in ride height may be performed by analysis of sensor data, e.g., indicating the ride height of the vehicle 20 and/or air pressure in the wheels 23a, 23b, 23c, 23d. In response to identifying that the vehicle 20 requires the increase in ride height, the method 100 progresses to a block 120.

The block 120 includes connecting the fluid supply 86 to the fluid connector 78 of the vehicle 20. For example, the female socket 90 of the fluid supply 86 may be coupled with the male nipple 88 of the fluid connector 78. After connecting the fluid supply 86, the method 100 progresses to block 130.

Block 130 includes increasing the ride height of the vehicle 20 by providing fluid from the fluid supply 86 through the fluid connector 78 to one or more of the damper assemblies 22a, 22b, 22c, 22d. The fluid may be provided from the fluid supply 86 through the fluid connector 78 to the second chamber of the damper assembly 22a, 22b, 22c, 22d. Fluid may be provided, for example, by opening a valve of the fluid supply 86 to permit pressurized fluid to flow out of the female socket 90 and into the male nipple 88. Fluid may continue to be provided from the fluid supply 86 through the fluid connector 78 until the vehicle suspension is fully extended. When the second cylinder 40 of the damper assembly 22a, 22b, 22c, 22d abuts, e.g., the first end cap 38, or other travel limits in the suspension such as droop limiter tethers or similar, the vehicle 20 may be at maximum ride height, i.e., the damper assembly 22a, 22b, 22c, 22d may be fully extended. When the suspension is fully extended the first cylinder 24 of the damper assembly 22a, 22b, 22c, 22d may abut the second cylinder 40 of the damper assembly.

Fluid may be provided from the fluid supply 86 through the fluid connector 78 to just the first damper assembly 20a and the second damper assembly 20b to increase the ride height at the rear end 29 of the vehicle 20. For example, the fluid connector 78 may only be in fluid communication with the first damper assembly 20a and the second damper assembly 20b. As another example, the vehicle 20 may include one or more valves (not shown) that are actuatable to selectively permit and inhibit fluid flow from the fluid connector 78 to each damper assembly 22a, 22b, 22c, 22d individually, e.g., to permit flow to the first damper assembly 22a and the second damper assembly 22b and inhibit flow to the third damper assembly 22b and fourth damper assembly 22d. After increasing the ride height, the method 100 progresses to block 140.

The block 140 includes disconnecting the fluid supply 86 from the fluid connector 78 after increasing the ride height. The fluid supply 86 may be disconnected, for example, by decoupling the female socket 90 of the fluid supply 86 from the male nipple 88 of the fluid connector 78.

The adjectives first, second, etc., are used throughout this document as identifiers and, unless explicitly stated otherwise, are not intended to signify importance, order, or quantity. Use of "in response to," "based on," and "upon" herein indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle, comprising:
    a vehicle body;
    a damper assembly for controlling movement of a wheel relative to the vehicle body; and
    a fluid connector spaced from the damper assembly and supported at the vehicle body, the fluid connector in fluid communication with the damper assembly to provide fluid to the damper assembly and increase ride height of the vehicle,
    wherein the damper assembly includes:
        a first cylinder defining a first chamber;
        a second cylinder defining a second chamber;
        a piston rod extending from within the first chamber along an axis to the second cylinder;
        a piston fixed to the piston rod and movable within the first chamber along the axis; and
        a plunger movable within the second chamber along the axis from a compact position to an extended position.

2. The vehicle of claim 1, further comprising a second damper assembly for controlling movement of a second wheel relative to the vehicle body, the fluid connector in fluid communication with the second damper assembly.

3. The vehicle of claim 2, wherein the vehicle body has a front end and a rear end, and wherein the damper assembly and the second damper assembly are at the rear end.

4. The vehicle of claim 3, further comprising a third damper assembly for controlling movement of a third wheel relative to the vehicle body and a fourth damper assembly for controlling movement of a fourth wheel relative to the vehicle body, the fluid connector in fluid communication with the third damper assembly and the fourth damper assembly, and wherein the third damper assembly and the fourth damper assembly are at the front end.

5. The vehicle of claim 1, wherein the vehicle body includes a body panel, and wherein the fluid connector is at the body panel.

6. The vehicle of claim 1, wherein the fluid connector includes a valve selectively permitting fluid flow through the fluid connector.

7. The vehicle of claim 1, wherein the damper assembly includes a coil spring surrounding the first cylinder and the second cylinder.

8. The vehicle of claim 7, wherein, wherein the first cylinder of the damper assembly includes a first flange and the second cylinder of the damper assembly includes a second flange, the coil spring extending from the first flange to the second flange.

9. The vehicle of claim 1, wherein the piston rod of the damper assembly is movable relative to the second cylinder and is sealed to the second cylinder.

10. The vehicle of claim 1, wherein the piston rod of the damper assembly is fixed to the plunger of the damper assembly.

11. The vehicle of claim 1, wherein the first cylinder of the damper assembly is spaced from the second cylinder of the damper assembly along the axis when the plunger is at the compact position.

12. The vehicle of claim 11, wherein the first cylinder of the damper assembly abuts the second cylinder of the damper assembly when the plunger is at the extended position.

13. A method for increasing a ride height of a vehicle, the method comprising:
   connecting a fluid supply to a fluid connector of the vehicle, the fluid connector in fluid communication with a damper assembly for controlling movement of a wheel of the vehicle relative to a vehicle body of the vehicle;
   increasing the ride height of the vehicle by providing fluid from the fluid supply through the fluid connector to the damper assembly; and
   disconnecting the fluid supply from the fluid connector after increasing the ride height,
   wherein the damper assembly includes:
      a first cylinder defining a first chamber;
      a second cylinder defining a second chamber;
      a piston rod extending from within the first chamber along an axis to the second cylinder;
      a piston fixed to the piston rod and movable within the first chamber along the axis; and
      a plunger movable within the second chamber along the axis from a compact position to an extended position, and
   wherein increasing the ride height of the vehicle includes providing fluid from the fluid supply through the fluid connector to the second chamber of the damper assembly.

14. The method of claim 13, wherein the fluid connector is in fluid communication with a second damper assembly for controlling movement of a second wheel of the vehicle relative to the vehicle body of the vehicle, and wherein increasing the ride height of the vehicle includes providing fluid from the fluid supply through the fluid connector to the second damper assembly.

15. The method of claim 14, wherein the damper assembly and the second damper assembly are at a rear end of the vehicle, and wherein increasing the ride height of the vehicle includes increasing the ride height at the rear end.

16. The method of claim 13, further comprising identifying that the vehicle requires an increase in ride height, and wherein connecting the fluid supply to the fluid connector is performed in response to identifying that the vehicle requires the increase in ride height.

17. The method of claim 13, wherein increasing the ride height of the vehicle includes providing fluid from the fluid supply through the fluid connector until the first cylinder of the damper assembly abuts the second cylinder of the damper assembly.

* * * * *